March 4, 1924. 1,485,986

W. E. MAGIE ET AL

HYDRAULIC TRANSMISSION

Original Filed March 25, 1918    5 Sheets-Sheet 1

WITNESS:

INVENTORS:
William E. Magie
and Walter Ferris.
BY
ATTORNEYS.

March 4, 1924.

W. E. MAGIE ET AL

1,485,986

HYDRAULIC TRANSMISSION

Original Filed March 25, 1918   5 Sheets-Sheet 5

INVENTORS:
William E. Magie
and Walter Ferris.

BY Ralph W. Brown
ATTORNEY.

Patented Mar. 4, 1924.

1,485,986

UNITED STATES PATENT OFFICE.

WILLIAM E. MAGIE, OF BUFFALO, NEW YORK, AND WALTER FERRIS, OF SOUTH MILWAUKEE, WISCONSIN, ASSIGNORS TO THE OILGEAR COMPANY, OF MILWAUKEE, WISCONSIN, A CORPORATION OF WISCONSIN.

HYDRAULIC TRANSMISSION.

Application filed March 25, 1918, Serial No. 224,503. Renewed August 15, 1921. Serial No. 492,460.

*To all whom it may concern:*

Be it known that we, WILLIAM E. MAGIE and WALTER FERRIS, citizens of the United States, residing, respectively, at Buffalo, in the county of Erie and State of New York, and South Milwaukee, in the county of Milwaukee and State of Wisconsin, have invented a certain new and useful Improvement in Hydraulic Transmissions, of which the following is a specification.

Our invention relates to a hydraulic power transmission device consisting of a pump having variable displacement and a fluid motor operated by fluid delivered by the pump; pump and motor comprising groups of cylinders radially arranged, as hereinafter described.

Among the objects of our invention is to reduce the friction of the moving parts and thereby increase the efficiency; to furnish an improved means of varying the pump displacement; to provide a mechanism without periodical disturbances in rate of flow; to provide a mechanism in which the total volume of oil included in the spaces between the pump plungers and the motor plungers remains constant during change in displacement of pump or of motor; to provide a system of ports and valve surfaces whereby the revolving cylinders can receive and discharge oil from the stationary co-acting parts with a minimum of friction and of leakage; to provide for returning leakage from high pressure system directly into the low pressure ports without requiring the use of a pump to handle this large and variable amount of fluid; to provide an operating mechanism which does not agitate the reserve oil, thereby permitting sediment to be deposited; to provide a fluid power transmission mechanism operating with the fluid divided into three zones of pressure and with the moving parts encased in an empty chamber, separated from the reserve fluid reservoir. Other objects of my invention will appear from time to time in the specification.

Our invention is illustrated more or less diagrammatically in the accompanying drawings wherein.

Like parts are indicated by like characters in all the drawings.

The pump and motor are substantially identical. A description of one will suffice for the other. Where both parts are present in the same drawing we use the exponent "'" to indicate the motor end.

The terms "oil" and "working fluid" are synonymous in the following description, oil being preferable on account of its adaptability in devices of this kind.

Figures 4, 6, 7:
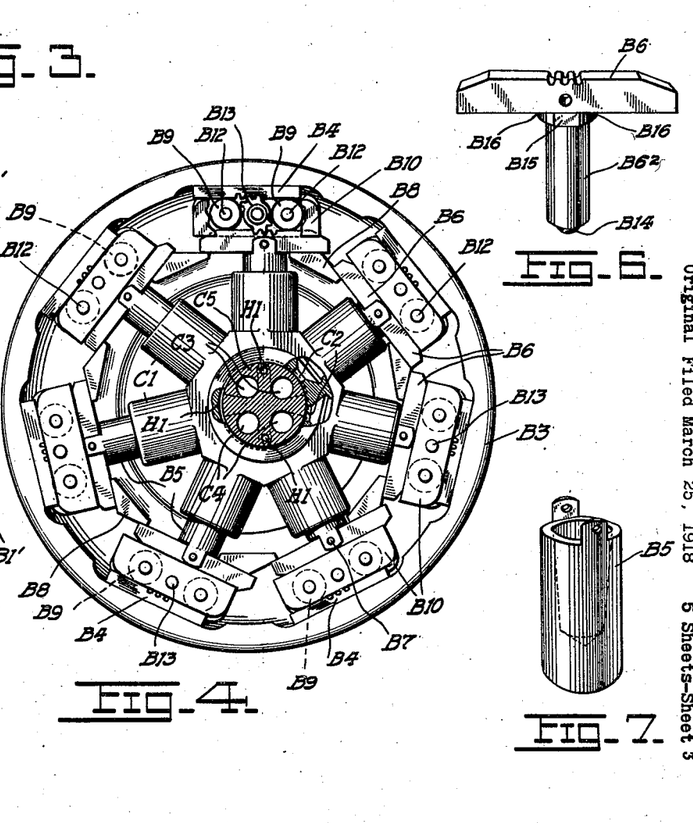
Figure 4 is a sectional view taken substantially along the line 4—4 of Figure 2, with the casing omitted.
Figure 6 is a perspective view of the cross head.
Figure 7 is a perspective view of one of the plungers.

The working parts are housed in a main casing $A^1$ closed at one end by the pump-end head $A^2$ and at the other by the motor-end head $A^{2'}$. The pump includes a driven shaft $B^1$ which receives through pulley $B^2$ the power which is to be transmitted by the mechanism. This pump shaft is mounted in bearings $A^3$ and $A^4$ mounted in the endhead $A^2$, and has keyed to its inner end the driving disc $B^3$ which is cup shaped and has preferably seven equally spaced flats machined on the inner periphery thereof. To each of these flats is secured a hardened steel roller track $B^4$, having gear teeth formed in the central portion for purposes hereinafter described. In the same transverse plane as the centers of these roller paths, is located the central plane of a cylinder barrel $C^1$ formed with seven equally spaced cylindrical bores. Within each of these bores is a closely fitting plunger $B^5$ secured to a T shaped steel crosshead $B^6$ whose outer surface is provided with a roller path and with gear teeth for purposes hereinafter described. Plungers and crossheads are held in assembly by a lock pin $B^7$ which fits tightly in the hole shown in crosshead $B^6$ (Fig. 6), and loosely in corresponding holes through the lugs on plunger $B^5$ (Fig. 7). This is a retaining pin only and has no function when machine is filled with oil and in normal operation.

The inner faces of the crossheads $B^6$ slide upon equally spaced lugs $B^8$ which are integral with the web of the driving discs $B^3$. The outer roller path surface of each crosshead engages with the rollers $B^9$ which rollers also engage the roller paths $B^4$ previously described. Each roller bearing assembly comprises a pair of rollers $B^9$ carried in, and positioned by, a roller cage consisting of two side plates $B^{10}$ adapted for receiving the journals $B^{12}$ of the rollers $B^9$ and also the journals of a positioning gear $B^{13}$ which is located between the rollers $B^9$ and is in mesh with teeth formed respectively in the outer roller path $B^4$ and in the crosshead $B^6$ thereby preventing the roller cage and the rollers $B^9$ from departing from their proper position with respect to their co-acting parts.

The shanks $B^{62}$ of the crossheads $B^6$ fit closely in the lower end of the bored plungers $B^5$ the thrust being transmitted from crossheads to plunger through a rocking surface $B^{14}$ formed at the end of the shank $B^{62}$ which permits a slight lateral deflection of crossheads with respect to plungers without any binding action. This lateral deflection is only required in the direction parallel to the axis of the shaft $B^1$ to compensate for deflections of the driving discs under load, which may act to carry the central plane of roller paths $B^4$ slightly away from the central plane of cylinder barrel $C^1$. To accommodate this deflection the diameter of the flange $B^{16}$, which fits the bore of the plungers, is cut away as at $B^{15}$ on opposite sides permitting the lateral deflection of these parts but retaining close contact with the conical bore of the plungers at the unflattened areas of the flanges $B^{16}$ which lie in the central plane of the driving discs. The purpose of this close contact is to maintain at all times equal angular movement of the driving disc $B^3$ and the cylinder barrel $C^1$ which receives its motion from the driving disc through the T shaped crossheads $B^6$ and the co-acting plungers $B^5$.

Structurally $B^6$, $B^{62}$ and $B^5$ form a single rigid unit or cross-sliding member having two arms: one being the crosshead arm $B^6$ preferably at right angles to the other arm which is formed by the shank $B^{62}$ and the plunger $B^5$. The crosshead arms $B^6$ slide on the crank disc in a tangential direction, being closely guided by the roller paths $B^4$, the rollers $B^9$ and the lugs $B^8$. Each plunger engages its corresponding cylinder bore in a radial direction and is closely guided therein. These co-acting parts form a driving connection between the driving disc $B^3$ and the driven cylinder barrel $C^1$ which compels the cylinder barrel to occupy in all positions during its revolution a constant angular relation to the driving disc, whether the axes of the two rotating bodies are concentric (as when the pump is at zero stroke Fig. 1) or displaced as shown in Figures 11 and 12. It is also true that this same constant angular relation avoids the irregularities in piston travel which occur in mechanisms of this character in which the plungers are operated by means of connecting rods; in our arrangement the sum, at any point in the cycle, of all the distances of the various pistons from the extreme inward points of their strokes, is constant; and the total volume of the liquid enclosed within the cylinders and the communicating passages is constant. Another result is that the total volume of enclosed liquid does not change when the pump stroke is changed. The enclosed volume under the pistons and in the communicating passages is constant for all adjustments of the mechanism and for all positions during the cycle, thus attaining constant non-pulsating flow of the working fluid at all times.

The pump and motor cylinder barrels $C^1$ and $C^{1'}$ are each axially bored to receive the pump and motor pintles $C^5$ and $C^{5'}$, respectively, upon which they are rotatably mounted. Each axial bore constitutes a valve chamber having a series of ports $C^2$ or $C^{2'}$, one for each cylinder bore, cooperating with ports $C^3$, $C^4$ or $C^{3'}$, $C^{4'}$, formed in the supporting pintle above and below the axis thereof. Although either or both of the pintles may be adjustably mounted, the motor pintle $C^{5'}$ in this instance constitutes an integral part of a stationary cross rail $C^8$. The axis of the pintle is permanently offset a distance "E" (Figs. 11 and 12) from the axis of the disc $B^{3'}$ and shaft $B^{1'}$. The pump pintle $C^5$ is formed integral with a slide block $C^7$ mounted on the cross rail $C^8$ for adjustment longitudinally thereof. Any appropriate means, such as a screw $C^{12}$ threaded in the casing $A^1$ and having a swivel connection $C^{30}$ with the block $C^7$, may be employed for adjusting and controlling the position of the block upon the rail to thereby vary and control the position of the pump pintle $C^5$ relative to the axis of the driving disc $B^3$. The screw $C^{12}$ shown is actuated and controlled by a hand wheel $C^{13}$.

Figure 1:
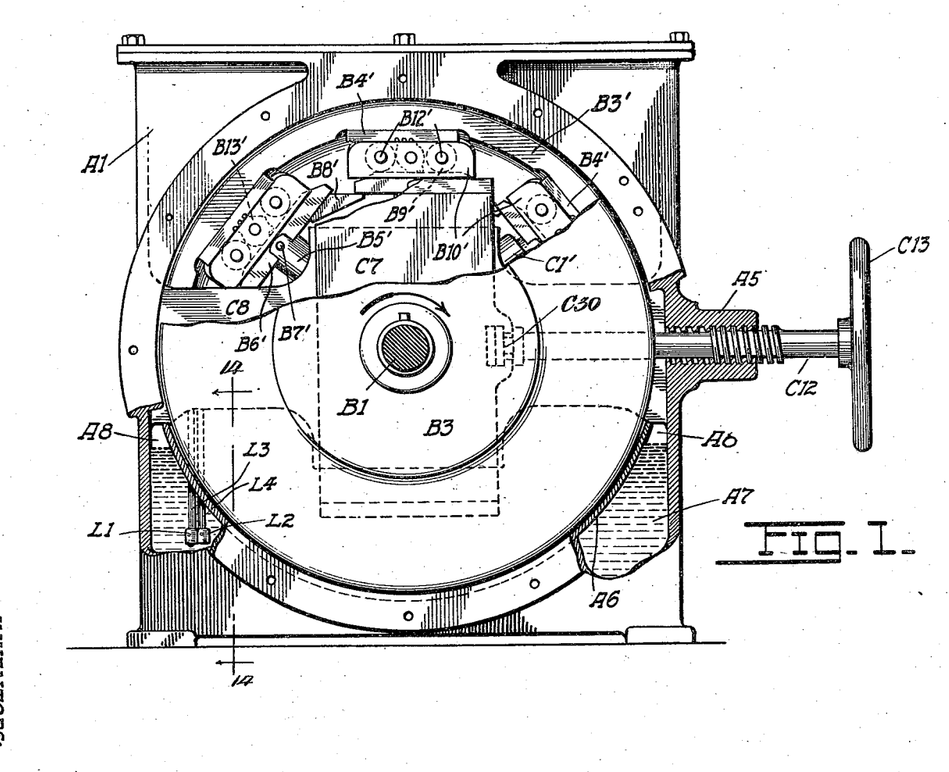
Figure 1 is an end view in section taken substantially along the line 1—1 of Figure 2, with parts broken away.
Figures 2, 11, 12:
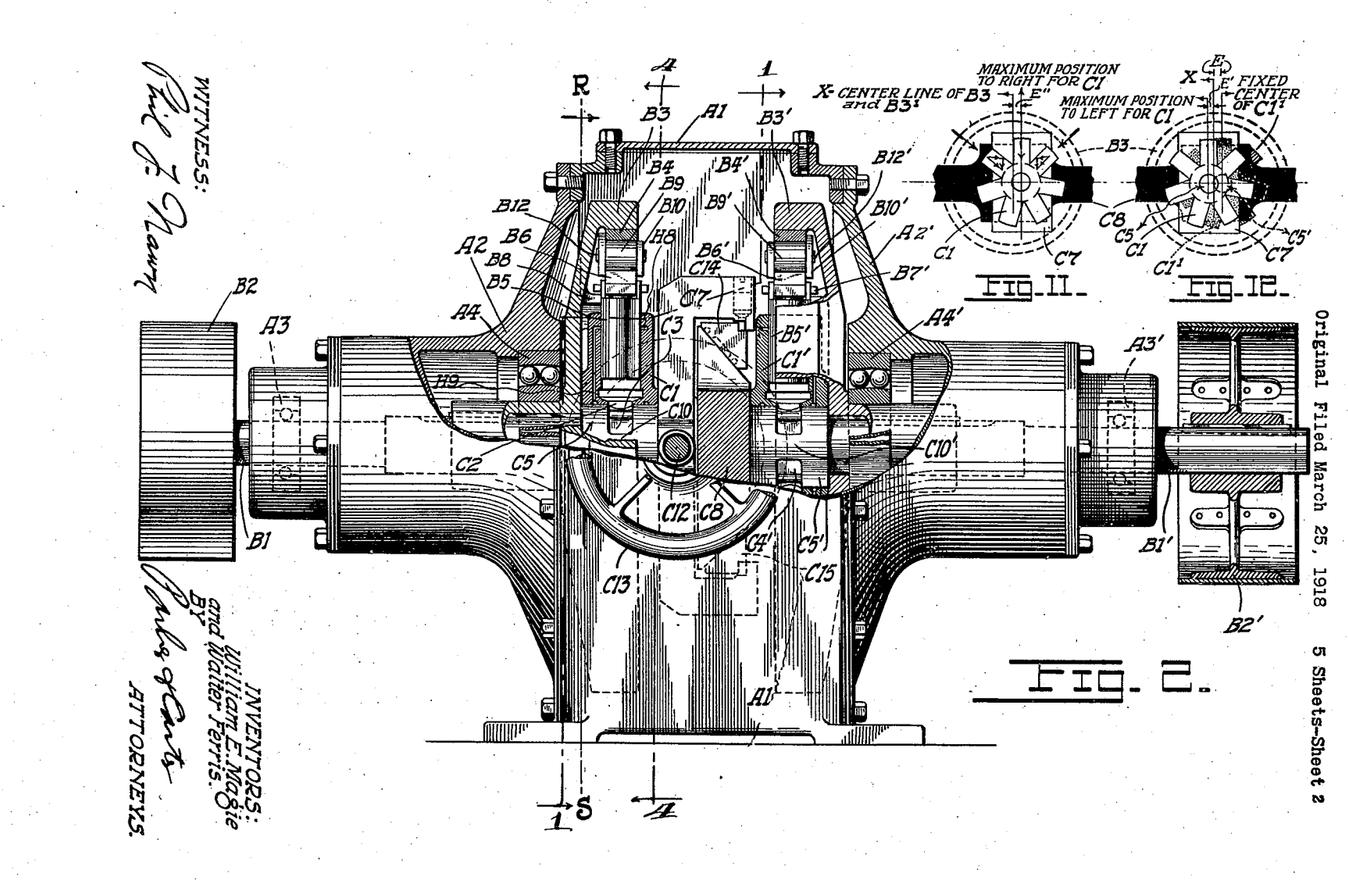
Figure 2 is a side elevation with parts in section.
Figures 11 and 12 are diagrammatic views showing relation of pump and motor ends taken on the line R—S of Figure 2.
Figures 5, 8, 9, 10, 13:
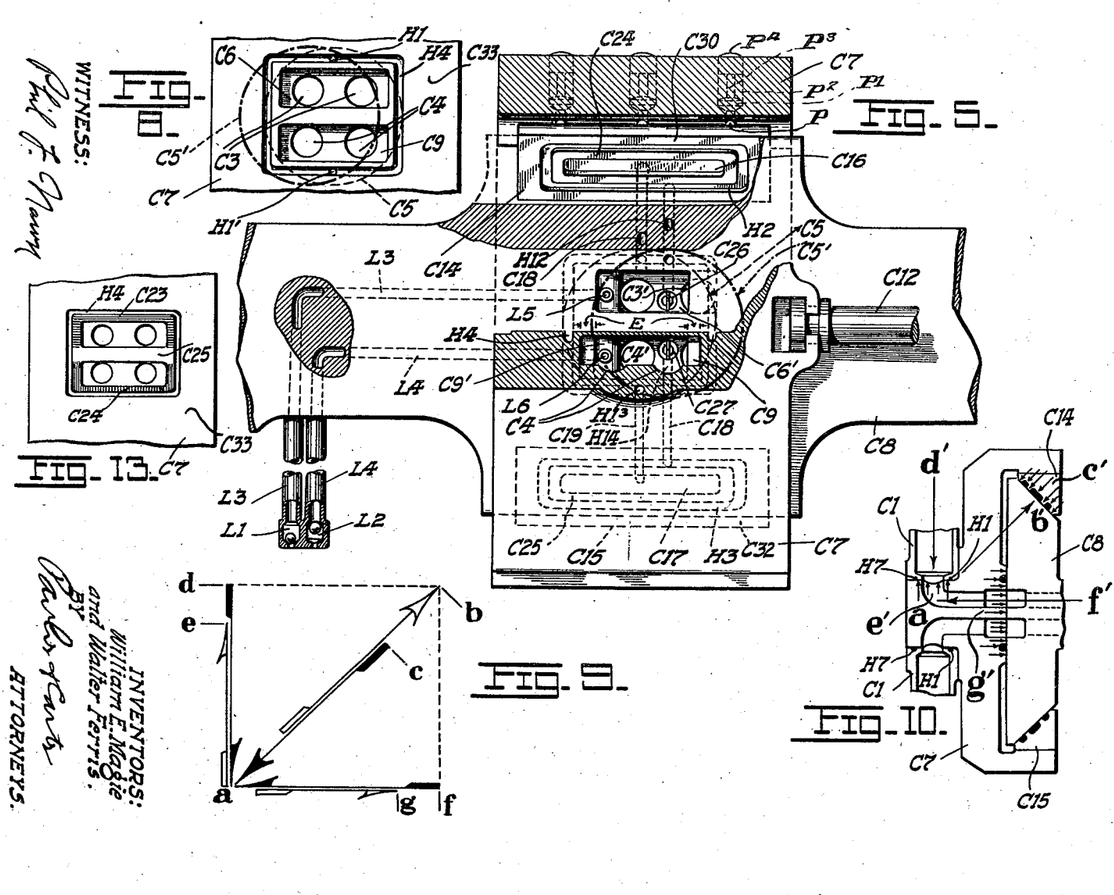
Figure 5 is a section on an enlarged scale along the line 5—5 of Figure 3.
Figure 8 is a side elevation of a portion of the contact face with the sliding pindle block member.
Figure 9 is a pressure diagram.
Figure 10 is a diagram with the pressure areas.
Figure 13 is a view similar to Figure 8 showing pressure areas.
Figure 14:
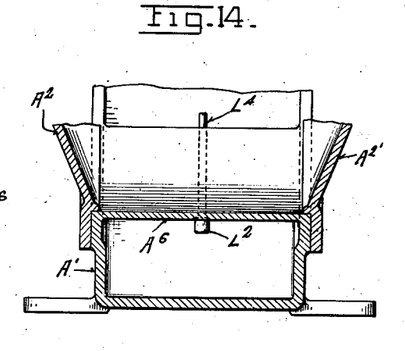
Figure 14 is a vertical sectional view of the catch basin taken substantially along the line 14—14 of Figure 1.

When the sliding pintle block $C^7$ is in central position as in Fig. 1 and Fig. 5 the axis of pump-pintle $C^5$ upon which revolves cylinder barrel $C^1$ coincides with axis of pump-shaft $B^1$ and pump driving disc $B^3$. Therefore, as these parts revolve together the crossheads $B^6$ with attached plungers $B^5$ revolving with crank disc $B^3$ maintain a constant distance from the center of pintle $C^5$ around which the cylinder barrel is revolving, consequently said plungers $B^5$ will have no stroke in their corresponding pump cylinders, and no oil will be drawn in or expelled through the cylinder ports $C^2$, the pump continuing to revolve without displacing any oil.

If the sliding pintle block $C^7$ be moved a distance $E'$ (Fig. 12) to the left of the axis X, the driving disc $B^3$ and the pump cylinder barrel $C^1$ will be eccentric to each other and plungers will reciprocate in and out of their respective cylinder bores, each plunger making one double stroke in each revolution of the disc. In the position shown in Fig. 12, the plungers will be at the extreme in-stroke as they pass the horizontal axis on the left and at extreme outstroke as they pass the horizontal axis on the right. The direction of pump rotation is shown by arrow on Fig. 1; hence during its passage through the upper semi-circle to Fig. 12, each plunger is being gradually withdrawn from its cylinder as it passes from extreme in-stroke at the left to extreme out-stroke at the right, thereby taking in a cylinder full of oil from port $C^3$. As any given cylinder port $C^2$ passes the horizontal axis at the right of Fig. 12, it is momentarily closed by the bridge $C^{10}$ between port $C^3$ and port $C^4$. Continuing its clockwise movement port $C^2$ is instantly opened to communicate with the lower pintle port $C^4$ as said port passes the right hand bridge, and thereafter during its entire half revolution in the lower semi-circle the corresponding plunger $B^5$ is moving radially inward in its cylinder and expelling oil through port $C^2$ into the lower pintle port $C^4$, as hereinafter explained. This oil is conducted through communicating ports to a similar port $C^{4'}$ and acts against similar motor plungers $B^{5'}$ thereby compelling a similar motor cylinder barrel $C^{1'}$ and corresponding motor driving disc $B^{3'}$ to revolve. The pump plungers as they expel oil from the lower port $C^4$ generate, in this oil, sufficient pressure to overcome whatever resistance may be opposing the revolution of the motor shaft $B^{1'}$.

If the sliding pintle block $C^7$ be moved to the left of axis X a less distance than $E'$ (Figs. 11 and 12) the eccentricity of pintle $C^5$ with regard to driving disc $B^3$ would be reduced and the stroke of each pump plunger $B^5$ will be correspondingly reduced. The rotative speed of shaft $B^1$ being taken as constant, the amount of oil drawn by the pump from port $C^3$ and expelled into port $C^4$ in a given time is proportional to the stroke of the plungers and the amount of the eccentricity allowed said plungers, $E^1$, the total stroke of each plunger being double the eccentricity given. By varying this eccentricity as desired, from zero to a maximum toward the left, as shown in Fig. 12, any desired amount of oil per unit of time may be transferred by the pump from port $C^3$ to port $C^4$.

Referring to Fig. 12, E represents the fixed eccentricity of motor-end pintle $C^{5'}$ which is formed integral with cross rail $C^8$. This eccentricity will cause each motor plunger to take a stroke, equal to twice E. If $E'$, the maximum eccentricity of the pump, is equal to E (the fixed eccentricity of the motor, the cylinder diameters being the same) the pump at full stroke will deliver just enough oil per revolution to operate the motor through one revolution; causing motor to revolve at the same speed as the pump. If the sliding block $C^7$ be moved off center until the eccentricity $E'$ is only one-quarter of E, four revolutions of the pump will be required to deliver enough oil to turn the motor around once and the speed of the motor will be one-quarter of the full speed. Similarly, any other intermediate motor speeds from zero to maximum may be obtained by varying the distance $E'$, Fig. 12.

Fig. 11 indicates the position of the mechanism when sliding block $C^7$ is moved a distance $E''$ to the right of axis X, said distance $E''$ being taken equal to the fixed eccentricity E of the motor-pintle $C^{5'}$. The pump cylinder barrel $C'$ is therefore superposed in this figure upon the motor cylinder barrel $C^{1'}$. In this condition, continuing the clockwise rotation of the pump shaft $B^1$, the plungers will be at full in-stroke at the right-hand of Figure 11 and at the full out-stroke at the left hand of said figure. The lower port $C^4$ will now become the low pressure or intake port to pump while the oil will be expelled as the cylinders pass around through the upper semi-circle into port $C^3$, receiving sufficient pressure from the pump-plungers to overcome the resistance opposing the revolution of the motor shaft $B^{1'}$.

When the upper port $C^3$ constitutes the high pressure side of the oil circuit, oil passing from this port acts against the plungers $B^{5'}$ in the upper half of the path of travel of the motor plungers. As the pintle center from which these plungers rotate is to the right of the center of the motor driving disc $B^{3'}$, the radial plunger thrusts act to revolve this disc over to the left or opposite to the pump's direction of rotation. On the other hand, if the high pressure oil is delivered by the pump into the lower port $C^4$ it will act outward upon the plungers $B^{5'}$ in the lower semi-circle and will tend to revolve disc $B^{3'}$ clockwise, or in the same direction as the pump-disc.

Communication between the pump-pintle port $C^4$ and the corresponding motor-pintle port $C^{4'}$ is maintained in all positions of the sliding pintle block $C^7$ by means of two elongated abutting ports $C^9$ and $C^{9'}$ formed respectively in the sliding block $C^7$ and the stationary cross rail $C^8$. Port $C^9$ is longer than its corresponding port $C^{9'}$, the additional length being the amount E at each end representing the maximum eccentricity of the center of the pump-pintle in either direction from the axis X, Fig. 5. When the pump pintle $C^5$ is moved to the extreme left-hand position, the right hand end of port $C^9$ will register with the right-hand end of port $C^{9'}$ thus avoiding any constriction. Two similar ports $C^6$ and $C^{6'}$ establish communication between the upper pump-pintle port $C^3$ and the upper motor-pintle port $C^{3'}$.

During the movement of each cylinder through the semi-circle in communication with the pressure port, a heavy reaction between each crosshead $B^6$ or $B^{6'}$ and the co-acting driving discs $B^3$ or $B^{3'}$, is transmitted through the rollers $B^9$ or $B^{9'}$ as the crossheads reciprocate on the track $B^4$ or $B^{4'}$. In the case of the pump end, this reaction takes the form of a force transmitted from the driving disc to the plungers generating a high pressure in the enclosed liquid which will react against the motor plungers. In the case of the motor end, the reaction is transmitted through the motor plungers to the driving disc which receives therefrom a driving torque. The rollers $B^9$ and $B^{9'}$ interposed between the plunger assemblies and their corresponding driving discs reduce friction at these points; substituting for a sliding friction a very small amount of rolling friction.

In this connection, it is important to note that lugs $B^8$ and $B^{8'}$ on the pump and motor discs $B^3$ and $B^{3'}$, respectively, have no function during the high pressure stroke of the mechanism. (The high pressure stroke is the delivery or inward stroke of the pump plungers, and the driving or outward stroke of the motor plungers.) These lugs come into action to maintain the assembly in correct relation when there is no pressure in the mechanism. In the present case, where no leakage return pump is used, these lugs also function to draw the pump plungers $B^5$ outwardly in their cylinders $C^1$ during the suction strokes, thus permitting atmospheric pressure to force makeup fluid in through one of the check valves $L^1$ or $L^2$ to replenish fluid which is leaking from the high pressure side of the circuit.

During the high pressure strokes of the pump and motor plungers all pressures between them and their corresponding discs $B^3$ or $B^{3'}$ are transmitted through the corresponding sets of rollers $B^9$ or $B^{9'}$, without reaction upon the lugs $C^8$ or $C^{8'}$. To accomplish this, each roller set is so disposed and controlled as to extend across the longitudinal axis of its corresponding plunger under all conditions of operation. In other words, the two end rollers of each set are always located on opposite sides of the longitudinal axis of the corresponding plunger during relative reciprocation between the plunger and corresponding track $B^4$ or $B^{4'}$. By this arrangement the rollers of each set react under the transmitted plunger thrust to maintain the associated crosshead parallel with the corresponding track $B^4$ or $B^{4'}$; and to maintain the line of thrust, which corresponds to the longitudinal axis of the plunger substantially normal to the track. Were the rollers of the set permitted to pass beyond this longitudinal axis or line of thrust the associated crosshead would tilt and the end thereof be forced against the adjacent lug $C^8$ or $C^{8'}$.

Figure 15:
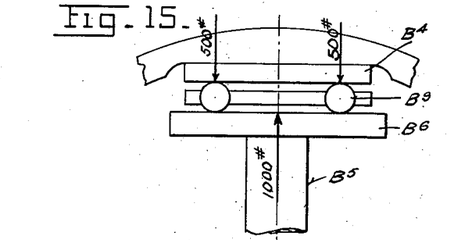
Figures 15, 16 and 17 are diagrammatic views illustrating the function of the roller bearings during operation of the pump or motor.
Figure 16:
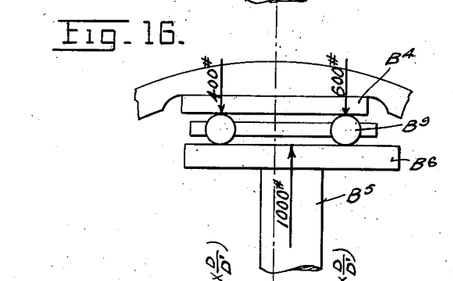
Figure 17:
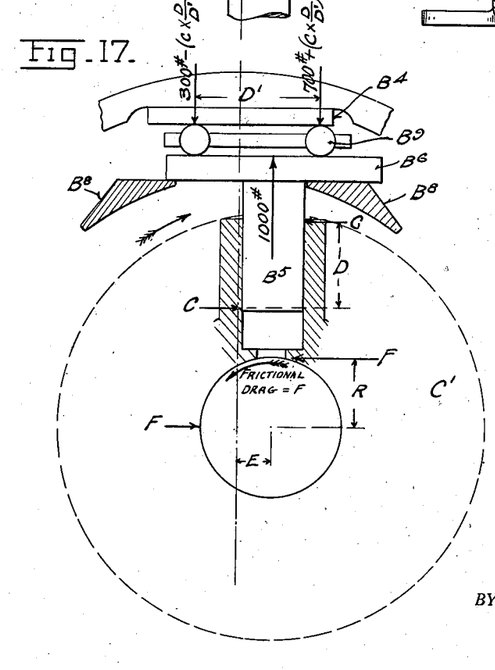

As each set of rollers travels back and forth between its track and plunger crosshead the transmitted pressure is distributed between the rollers in different proportions, inversely as the distance from the plunger to the roller contact with the crosshead. This is illustrated in Figures 15, 16 and 17. Figure 15 shows the relation of the parts when the plunger axis intercepts the axis of rotation of the driving disc and the crosshead is in central position. The plunger thrust is then delivered equally to the two rollers, but no driving torque is caused in driving disc $B^3$ by the plunger thrust. Assuming a maximum eccentricity E of 1/2 inch, and the distance between roller centers 5/4 inch, Fig. 16 shows the relation of parts when the plunger has translated 1/4 inch away from the disc axis. The roller cage has traveled 1/8 inch, and assuming a total plunger thrust of 1000 pounds, the figure shows that the rollers are now bearing respectively 400 pounds and 600 pounds. Figure 17 shows the further change when the plunger has traveled the full 1/2 inch away from the disc axis, the rollers now receiving 300 pounds and 700 pounds, respectively.

Figure 17 further illustrates the forces by which cylinder barrel $C^1$ is carried around on the stationary pintle by the fit of the plungers in their respective cylinders. This is accompanied by a slight additional modification of the loads on rollers $B^9$ but still is accomplished without bringing crosshead B⁶ in engagement with guiding lugs B⁸. It will be understood that the only resistance to the revolution of cylinder barrel C¹ on the pintle is the slight frictional drag of the oil film between them. Assuming that this frictional drag is being overcome by a single plunger in the position shown in Figure 17, and that the friction occurs immediately under that plunger, the moment of the frictional drag against the cylinder barrel C¹ will be friction force F multiplied by the radius R of the pintle. To overcome this drag, plunger B⁵ develops another force couple consisting of equal opposed forces C near its lower and upper contact points, multiplied by the distance D between these points. The plunger, by means of the crosshead on which it is mounted in turn delivers a third force couple of equal moment to the rollers B⁹. One force of this couple increases the corresponding roller load by the amount C multiplied by $\frac{D}{D^1}$, while the other force decreases its corresponding roller load by the same amount.

The peculiar form of the ports and coacting surfaces in the interior of the cylinder barrel C¹ or C¹′ and on the exterior of the pintles C⁵ or C⁵′ further contributes to reduction of friction and increase of efficiency. Two drainage ports or grooves H¹, H⁷ (see Fig. 10) and H¹′, H⁷′ extend around the interior bore of the cylinder barrels C¹ and C¹′ respectively. The cylindrical contact surface included between the inner edges of these ports is subjected to the action of high pressure on the pressure port side of pintle where the adjacent cylinders are filled with high pressure oil. Around the semi-circle adjacent to low pressure port this surface is subject only to the action of low pressure oil. Should a lifting tendency exist it would be opposed and lifting prevented by the action of the surface in contact on the opposite side of the closely fitted valve pintle, which would not permit the port surfaces and valve face surfaces at any point of the circle to separate.

The cylindrical pintle surfaces outside of the grooves H¹, H⁷, H¹′ or H⁷′ have a double function,—they close the grooves and make them act as leakage ducts as hereinafter explained; and they also act as additional bearing surface for the revolving cylinder barrel upon the valve pintle. In addition to these ducts the interior of each cylinder has cut around it near the outer end of the bore, drainage grooves H⁸ and H⁸′ respectively which communicate with the grooves H⁷ H⁷′ respectively by passage H⁹ H⁹′.

Drainage grooves H² and H³ also surround the counter pressure areas in the upper and lower gibs C¹⁴ and C¹⁵ respectively. These gibs are also respectively provided with closed pressure chambers C¹⁶ and C¹⁷ supplied respectively through the ducts C¹⁸ and C¹⁹ which communicate respectively with the ports C⁶′ and C⁹′, thus insuring at all times the pressure chamber in each gib shall be supplied with oil of the pressure existing in the corresponding port. As this pressure is also the pressure existing in the pump cylinders C¹ which cause the reaction of the cylinder barrel against the pintle C⁵, it follows that this reaction together with the simultaneous reaction of cross rail C⁸ against C¹⁴, and the hydraulic counter pressure of gib C¹⁴ against the cross rail C⁸ are always in proper relation to each other, as diagrammatically indicated in Figure 9, without regard to the intensity of the oil pressure.

Similarly, the zone of contact at the sliding face between sliding pintle block C⁷ and stationary cross rail C⁸ is divided by a groove H⁴, entirely surrounding the two ports C⁶, C⁹ into an inner area and an outer area. Either the upper or the lower half of the inner area, surrounding respectively port C⁶ or port C⁹, is subject to high pressure. The other half is simultaneously subject to low pressure. When the upper ports C⁶ C⁶′ are under pressure, the oil is confined by the oil seal surfaces C²³ (shaded horizontally) and the central bar C²⁵ (left blank) some oil gradually leaking past the seals C²³ into groove H⁴, and some leaking across the central bar C²⁵ directly into the low pressure ports C⁹ C⁹′. The low pressure oil in ports C⁹ C⁹′ is confined by the seal surfaces C²⁴ (shaded vertically) inside of groove H⁴, and oil collected in this groove from leakage at this or other points is returned to port C⁹′ by means explained later. When motor is reversed, ports C³, etc., and C⁹, etc., interchange their above described functions.

When upper ports C³, C⁶, C⁶′ and C³′ are acting as pressure ports to transmit to the motor high pressure fluid delivered from the pump, the upper halves of the cylindrical pintle surfaces C⁵, C⁵′ are subjected to the high or working pressure existing in the communicating cylinders. This pressure is confined as closely as possible by the oil seals or contact surfaces C²⁰ and C²⁰′ towards the outer ends of the respective pintles and C²² and C²²′ toward the inner ends of the respective pintles. These surfaces are in working contact and some oil under pressure gradually leaks past them into the drainage grooves H¹, H¹′, H⁷ and H⁷′. Each of these four drainage grooves is connected by two ducts H⁵, H⁶, H⁵′ and H⁶′ respectively with four main leakage collecting ducts H¹⁰, H¹¹ in sliding block C⁷ and pintle C⁵ and H¹⁰′ and H¹¹′ in stationary cross rail C⁸ and pintle C⁵′. These main ducts lead directly into the rectangular groove $H^4$ both from the pump-pintle $C^5$ and from the motor-pintle $C^{5\prime}$, thereby receiving all of the primary or high pressure leakage past the oil seal surface on the sliding pintle block $C^7$ as already described.

The pressure existing in port $C^{6\prime}$ is also simultaneously conducted through the duct $C^{18}$ into the closed pressure chamber $C^{14}$ in the upper gib $C^{14}$ where it produces the hydraulic counter-pressure already described. Some oil leaks from this pressure chamber past the oil seal surfaces $C^{24}$ and $C^{25}$ in the upper and lower gibs $C^{14}$ and $C^{15}$ respectively into rectangular drainage grooves $H^2$ and $H^3$ of the upper and lower gibs respectively. These grooves are always connected by the ducts $H^{12}$ and $H^{13}$ with the main collecting ducts $H^{10}$ and $H^{11\prime}$ whereby any leakage across the gib oil seal surfaces $C^{24}$ or $C^{25}$ is returned into said main collecting ducts.

The ducts $H^{10\prime}$ and $H^{11\prime}$ together with all of the tributary ducts already described, form a closed system for gathering all of the oil which leaks past the aforesaid oil seal surfaces subjected to high pressure. The primary or high pressure leakage thus gathered is returned through one or other of the ducts $H^{14}$ through check valves $C^{27}$ or $C^{26}$ to whichever of the ports $C^{9\prime}$ or $C^{6\prime}$ is for the moment subjected to low or return pressure. This duct system, therefore, acts to return automatically and without pumping also without permitting escape into the open casing the principal part of the leakage past high pressure oil seals and working surfaces.

A certain amount of oil, however, escapes into the casing $A^1$ passing the contact surfaces outside of the various drainage ducts already described. These contact surfaces or secondary oil seals are $C^{28}$ and $C^{28\prime}$ at outer ends of plungers, $C^{29}$ and $C^{29\prime}$ at outer and inner ends respectively of pintles, $C^{30}$ and $C^{32}$ in upper and lower gibs respectively and $C^{33}$ the area without and around the rectangular drainage groove $H^4$. All of these secondary oil seals are subjected only to low or return pressure, and for reasons later described this pressure is practically constant, without regard to the pressure existing in the high pressure ports to furnish necessary power to drive the motor. Therefore the amount of leakage escaping past these secondary oil seals into the casing $A^1$ is practically constant under all conditions and can be handled by a leakage return system of small capacity. On the other hand the leakage gathered in the system of primary ducts already herein described and automatically returned thereby is large, because of the relatively high pressure, and variable because of the great variations in the working pressure existing in the high pressure ports.

This secondary leakage escaping into the casing $A^1$ and a catch basin $A^7$ is returned by atmospheric pressure acting on the inlet opening of one of the check valves $L^1$ or $L^2$. These valves are on the ends of the tubular extensions of the ducts $L^3$ and $L^4$ formed in the sliding block $C^7$ and communicate respectively with the upper port $C^{6\prime}$ and the lower port $C^{9\prime}$. When the upper port $C^{6\prime}$ is the pressure port, check valve $L^1$ will be held closed, preventing escape of oil into the casing. Low pressure will then exist in port $C^{9\prime}$, and if this pressure falls below the pressure of the atmosphere, due to lack of sufficient return oil in lower port system to fill the suction spaces under the pump plungers, air pressure on the surface of the oil body in catch basin $A^7$ will force in through the check valve $L^2$ and duct $L^4$ the necessary amount of make-up oil to fill the vacancy in the lower pressure port, and permit the pump to operate always with cylinders full of oil. The atmospheric pressure is assisted and a higher pressure maintained in low pressure ports by the action of the injector nozzles $L^5$ and $L^6$ through one of which the returned leakage is discharged into the ports $C^{9\prime}$ or $C^{6\prime}$. The nozzles are pointed toward the pump intake or ports $C^6$ and $C^9$ so that the rush of oil in the main ports passing the ends of the nozzles $L^5$ and $L^6$ sets up a suction in said nozzles. The nozzle happening to face the pressure port has the check valve of its corresponding duct $L^2$ (or $L^1$) closed in consequence of said pressure and in this way the fluid is prevented from escaping back to the catch basin $A^7$.

Figure 3:
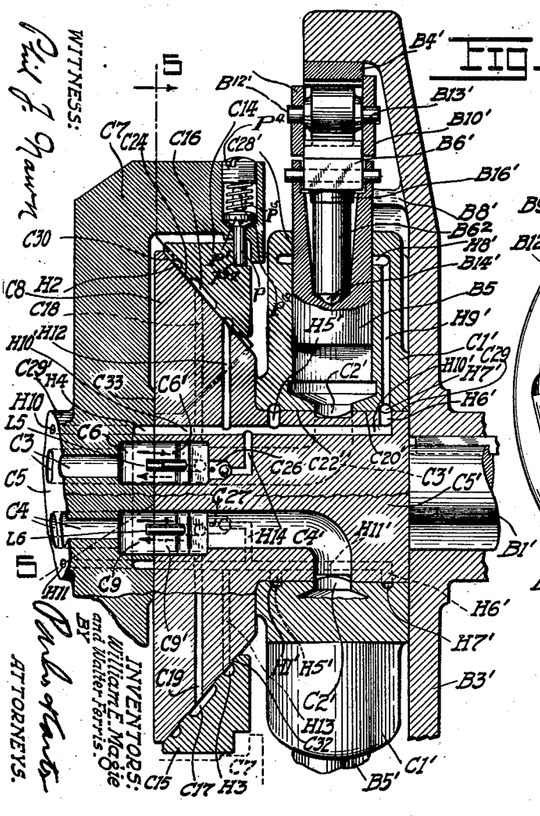
Figure 3 is a detail on an enlarged scale.

The relation between the currents of oil flowing in the main ports and these nozzles is indicated by the full arrows and by the dotted arrows on Figure 3. With the pressure in the upper ports $C^6$ and $C^{6\prime}$ the flow will be in the direction of the plain arrow impinging directly against the mouth of the nozzle $L^5$, while the return flow through port $C^{9\prime}$ and $C^9$ will be in the direction of the dotted arrow flowing past the open end of the nozzle $L^6$. In this condition $L^6$ is the nozzle through which leakage must return and the suction generated by said flow favors this action. If the machine be reversed port $C^9$ and $C^{9\prime}$ becomes the pressure port and the pressure flow is in the direction of plain arrow impinging against the mouth of nozzle $L^6$. (The check valves $L^1$ or $L^2$ close the ducts $L^3$ or $L^4$ against passage of oil as hereinbefore mentioned when said oil is flowing as per plain arrows). The return flow is now in the direction of dotted arrow and tends to assist by suction the entrance of returned leakage through nozzle $L^5$, the check valve $L^1$ at the end of this duct $L^3$ being now open. The suction head caused by the injector nozzle is added to the available atmospheric head and assists in overcoming the friction of the passages, permitting a greater amount of leakage to be returned. This suction increases with the velocity of the returning working fluid as it rushes past the injector nozzle, increases the injector feed when it is most needed to overcome the increased internal friction due to higher speed of liquid through the main ports, thus enabling the machine to operate faster before reaching the limiting speed at which the devices for returning the secondary leakage into the main circuit become insufficient, and beyond which speed the machine cannot operate.

The catch basin $A^7$ is formed by the outer walls of the main casing and by central inner partition $A^6$ which is formed so as to closely follow the periphery of the driving discs $B^3$ and $B^{3'}$. During the operation of the machine there is a continual escape of oil into the casing $A^1$ past the plunger fits, etc. Part of this oil is thrown outward against the walls and drains directly down into the catch basin at the inlet openings $A^8$. The remainder of the leakage seeps into the concave surfaces above the partition $A^6$, where it is wiped up by the edges of the driving discs and thrown against the vertical walls of the casing $A^1$ and drains down through the openings $A^8$, into the catch basin $A^7$. All of the leakage into the casing is continuously returned to the catch basin $A^7$ and thence by atmospheric pressure through the make-up check valves $L^1$ or $L^2$ back into the system.

While in the catch basin, the oil is comparatively quiet, and the sediment collected is permitted to settle to the bottom, so that the returning oil which is taken from a higher level through the check valves $L^1$, $L^2$ will be repeatedly clarified.

Referring to Fig. 9 the arrow $a-d$ indicates the total vertical reaction of the cylinder barrel upon the pintle $C^5$ the arrow $a-b$ represents the reaction of the cross rail against the gib $C^{14}$, which is formed with the slope necessary to receive this reaction $a-b$ at right angles to its surface; and the arrow $a-f$ represents the consequent horizontal thrust of the cross rail against the sliding block, which thrust maintains a tight joint at the junctions of the sliding ports $C^6$ and $C^9$ with the stationary ports $C^{6'}$ and $C^{9'}$.

The arrows $e'$ (Fig. 10) indicate the counter pressure of oil between the bearing surface of cylinder barrel against pintle, tending to oppose the reaction $a-d$. The several arrows $c'$ represent the similar oil counter pressure at gib $C^{14}$ opposing the force $a-b$. The arrows $g'$ represent the similar oil counter pressure at abutting faces of sliding pintle block $C^7$ and stationary cross rail $C^8$, opposing the force $a-f$.

The ducts and pressure chambers whereby these counter pressures are maintained in the respective gibs and the action of leakage of high pressure oil outward through the primary oil seals whereby these counter pressures are set up at the bearing surfaces between cylinder barrels and pintles, and between the abutting faces of the sliding pintle block and stationary cross rail, have already been explained.

Figure 9 diagrammatically shows the total reactions $a-d$, $a-b$ and $a-f$ opposed respectively by the several hydraulic counter pressures $a-e$, $a-c$ and $a-g$, which latter three arrows representing respectively the summation of the groups of small pressure arrows lettered $e'$ $c'$ and $g'$ in Figure 10. As already explained, the abutting surfaces in each case are so limited by a system of drainage grooves that the oil counter pressure cannot become great enough to part the surfaces. In each case, therefore, there is a small excess of mechanical pressure over hydraulic counter pressure represented by the greater lengths of the arrows $a-d$, $a-b$ and $a-f$ in Figure 9. The remaining forces $d-e$, $b-c$ and $f-g$ are sufficient to maintain mechanical contact, yet with greatly reduced friction. This permits the cylinders to revolve on their pintles, under heavy oil pressure but with slight frictional losses, and also permits the sliding pintle block $C^7$ to be moved as required to change the speed of the motor, and without excessive effort on the part of the operator.

When the pump is delivering liquid under pressure, each cylinder connected with the pressure port is delivering a large radial force against the pintle $C^5$, as indicated by the arrows in the upper semi-circle of Fig. 11. The horizontal components of all of these axial forces largely cancel each other, but the vertical components all act in the same direction as indicated by the small force triangles drawn in Fig. 11 on the axes of the two inclined cylinders. The sum of all of these vertical components therefore acts downward (or upward in case of reversed motion) on the valve pintle $C^5$.

This sum of vertical components is represented by the line $d\,a$ in Fig. 9, and by the arrow $d^1$ in Figure 10. It is equilibrated by the horizontal force $f^1$ of Figure 10, which represents the pressure of the ported face of the stationary cross-rail $C^8$ against the abutting ported face of the sliding block $C^7$ and stationary cross rail $C^8$, and by the inclined force $b^1$ of Figure 10, which represents the total reaction of the stationary cross rail $C^8$ against the gib $C^{14}$. In this operating condition, the stationary cross rail is supporting the sliding block against the cylinder reaction by the two forces $f^1$ and $b^1$, the latter force reacting entirely against the gib $C^{14}$, while gib $C^{15}$ does not carry any part of the load, and might fall away from contact with its corresponding gib surface and thus cause air leakage if it were not closely held in contact by springs $P^5$ acting on plungers P as illustrated in Figure 3. The liquid under pressure in ports $C^6$ and $C^{61}$ acting against the area limited by the upper half of the perimeter of drain groove $H^4$ and by cross bar $C^{25}$ in Figure 13 tends to force apart the abutting ported surfaces between $C^7$ and $C^8$, and this counter pressure area is so proportioned that the hydrostatic force tending to separate the surfaces is somewhat less than the mechanical reaction $f^1$ tending to hold them in contact. The mechanical force $f^1$ therefore overcomes the hydrostatic force, contact is maintained and leakage prevented, except such as is necessary for lubrication. At the same time the mechanical friction to be overcome by the operator in the process of sliding the block $C^7$ to change the stroke is greatly reduced. Similarly, the counter pressure area within drain groove $H^2$ in gib $C^{14}$ (or $C^{15}$ respectively) is so proportioned that the hydrostatic pressure therein produces a force opposing and slightly less than the mechanical reaction $b^1$, thus permitting the mechanical force to hold the surfaces in contact with but slight leakage and greatly reduced friction, all in accordance with previous explanation referring to Figure 9. The pressure to which the surface adjacent to any cylinder port may be subjected depends upon the pressure within that cylinder, which pressure reacting between the surfaces in contact adjacent to edges of the port, has a tendency to lift the cylinder away from contact with the valve pintle at that point. This tendency is symbolized by the arrows $e'$, Fig. 10.

The pressure of the oil in the interior of the cylinder, symbolized by the arrow $d'$ in Fig. 10, tends to hold the cylinder down against the valve pintle. Including the area of the ports themselves, the pressure in which area acts equally in both directions, an exact balance would be obtained by making the net area of the cylindrical surface located between the inner edges of the grooves $H^1$ exactly equal to the total cross sectional area of all of the cylinders, provided that the pressure per square inch in that part of the pintle surface opposite to the interior of any given cylinder is the same as the pressure inside of the cylinder; but the pressure in this portion of the pintle surface has an average value less than that in the interior of the cylinder because of the leakage into the grooves $H^1$ which lowers the valve face pressure near the leakage edges. The width between the grooves $H^1$ may be such as to include a total valve seat pressure area slightly greater than the total cross sectional area of the cylinders.

It is preferable, however, to make the total cylindrical valve seat area slightly less than sufficient to lift the cylinders away from their valve seats.

When pump cylinder barrel $C^1$ is delivering a heavy reaction to its supporting pintle $C^5$, the resulting stress in the metal of sliding block $C^7$ may produce slight deflections which, if not compensated, would tend to loosen whichever of the gibs $C^{14}$, $C^{15}$, respectively, might be located on the side opposite to the gib surface supporting the reaction, Should such a loosening or separation take place, the suction side of the pump would tend to draw in air in between the loosened or separated gib and its corresponding surface. In order to enable one of these gibs to support a heavy reaction without shifting from its normal position, and at the same time to keep the other gib (which may tend to loosen on account of the deflections) pushed tightly against its corresponding gib surface, an adjustable screw and plunger mechanism is provided, the parts of which are designated as $P^1$, $P^2$, $P^3$, $P^4$, $P^5$.

Each gib $C^{14}$, $C^{15}$ respectively, is held and adjusted in its attachment to sliding block $C^7$ by three adjusting screws $P^4$ having projections of reduced diameter $P^3$ bearing upon the enlarged head $P^1$ of a plunger P which rests in a corresponding socket $P^2$ in the gib. The reduced diameter of projection $P^3$ leaves room for a spring $P^5$, which always tends to push plunger P hard against its corresponding gib, thus at all times pushing the gib as far as possible against its corresponding gib surface, and mantaining a contact between the gib and the gib surface irrespective of any deflections which may tend to relieve it. On the other hand, when one of the gibs as $C^{14}$ is supporting the entire pump reaction it forces the plungers P up against the ends of the adjusting screws $P^4$, thus supporting the maximum loads independently of springs $P^5$.

We claim:—

1. In a hydraulic transmission mechanism the combination of a support, a pintle block adjustable thereon, abutting faces on said support and block, fluid passages in said support and block communicating through said faces, a piston and cylinder assembly subjected to the pressure of fluid in said passages and producing a thrust on said block, and opposed faces on said support and block, said opposed faces being inclined in a direction away from the line of said thrust and toward said passages thereby reacting under said thrust to maintain said abutting faces in close contact.

2. In a hydraulic transmission the combination of a support, a pintle block adjustable thereon, abutting faces on said support and block, fluid passages in said support and block communicating through said faces, a piston and cylinder assembly subjected to the pressure of fluid in said passages and producing a thrust on said block, faces on said block each inclined in a direction toward the other and away from the line of said thrust, and similarly inclined faces on said support opposed to said last named faces and reacting under said thrust to produce a thrust component tending to retain said abutting faces in contact.

3. In a hydraulic transmission the combination of a fixed member, a member adjustable thereon, abutting faces on said members, fluid passages in said members communicating through said faces, a piston and cylinder assembly subjected to the pressure of fluid in said passages and producing a thrust on said adjustable member, a face on one of said members inclined in a direction toward said passages and away from the line of said thrust, and a gib connected with the other of said members and having an inclined face in close contact with said last named face.

4. In a hydraulic transmission the combination of a fixed member, a member slidable thereon, abutting faces on said members, fluid passages in said members communicating through said faces, a piston and cylinder assembly subjected to the pressure of fluid in said passages and producing a thrust on said adjustable member in either of two opposite directions, faces on one of said members each inclined in a direction toward the other and away from the line of said thrust, and gibs slidably connected with the other of said members and bearing against said inclined faces.

5. In a hydraulic transmission the combination of a fixed member, a second member slidable thereon, abutting faces on said members, fluid passages in said members communicating through said faces, a piston and cylinder assembly subjected to the pressure of fluid in said passages and producing a thrust on said slidable member in either of two opposite directions, faces on one of said members each inclined in a direction toward the other and away from the line of said thrust, gibs interposed between said last named faces and the other of said members, and yieldable means for maintaining said gibs in close contact with said last named faces.

6. In a hydraulic transmission the combination of a support, a block slidable thereon, abutting faces on said block and support, fluid passages in said block and support communicating through said faces, a piston and cylinder assembly at one side of the plane of said faces subjected to the pressure of fluid in said passages and producing a thrust on said block, and opposed thrust sustaining faces on said block and support at the other side of the plane of said abutting faces, said thrust sustaining faces reacting under the thrust to maintain said abutting faces in close contact.

7. In a hydraulic transmission having a fluid pump and motor in communication, adjustable means for sustaining the thrust of one of them and for varying the stroke thereof comprising fixed and movable blocks, gibs carried by one of said blocks and embracing said other block, inclined faces on said other block on which said gibs may slide, and means for introducing fluid under pressure between said gibs and faces to sustain pressure therebetween.

8. In a hydraulic transmission having a fluid pump and motor in communication, adjustable means for sustaining the thrust of one of them and for varying the stroke thereof comprising a thrust sustaining movable block, gibs thereon, a support extending between said gibs and having inclined faces on which said gibs may slide, and means for introducing fluid under pressure between said gibs and faces to sustain pressure therebetween.

9. In a hydraulic transmission having a fluid pump and motor in communication, adjustable means for sustaining the thrust of one of them and for varying the stroke thereof comprising a support having inclined faces, gibs slidable upon said faces, a movable thrust sustaining member supported by said gibs, and means for introducing fluid under pressure between said gibs and faces to sustain pressure therebetween.

10. In a hydraulic transmission having a fluid pump and motor in communication, adjustable means for sustaining the thrust of one of them and for varying the stroke thereof comprising stationary and movable blocks, gibs carried by one of them, the other having inclined faces upon which said gibs may slide, an open pocket disposed between each gib and the face upon which it slides, means for introducing fluid under pressure into said pocket, and a bleeder groove surrounding said pocket for draining off fluid which leaks from said pocket.

11. In a hydraulic transmission having a fluid pump and motor in communication, adjutsable means for sustaining the thrust of one of them and for carrying the stroke thereof comprising a stationary rail having inclined faces at the upper and lower edges thereof, a movable block, gibs supporting said block and slidable upon said faces, an open pocket between each gib and the face upon which it slides for receiving fluid under pressure, and a bleeder groove surrounding said pocket for intercepting and draining off fluid which leaks from said pocket.

12. In a transmission a stationary block, a gib resting thereupon, a movable block supported by said gib, a pumping member supported upon the movable block, a counter-pressure chamber formed between said gib and stationary block, and means whereby the hydraulic pressure existing in the pumping member is also communicated to the counter pressure chamber.

13. In a hydraulic transmission a stationary member having a ported face, a member having a ported face movable over said face of said stationary member, fluid passages in said members communicating through said face, operating means on said movable member subjected to the pressure of fluid in said passages, and means subjected to the fluid pressure in said passages for retaining said faces in contact.

14. In a hydraulic transmission having a pump, a reversible motor and two fluid passages connecting pump and motor, either of which carries the working fluid outgoing from the pump, the other simultaneously carrying the working fluid returning toward the pump, two leakage return ducts, one in each of said fluid passages, both terminating in orifices directed substantially in the direction of flow toward the pump, and means for closing that leakage return duct which enters the passage containing high pressure working fluid.

15. In a hydraulic transmission two members rotatable about substantially parallel axes, one of said members having a series of radial cylinder bores, a series of crossheads reciprocating longitudinally in said other member, one opposite each bore, and a thrust transmitting piston reciprocating in each bore and rockably engaged with the adjacent crosshead.

16. In a hydraulic transmission two members rotatable about substantially parallel axes, a group of cylinders and cooperating pistons disposed radially of one of said members, and a series of crossheads reciprocating longitudinally in said other member, each crosshead extending transversely of one of said cylinders and rockably engaged with its cooperating piston to receive the thrust therefrom.

17. In a hydraulic transmission two members rotatable about substantially parallel axes, a series of cylinders and cooperating pistons, each extending radially of one of said members, a series of crossheads reciprocating longitudinally in said other member, and thrust transmitting means between each of said crossheads and one of said pistons permitting a rocking action therebetween normal to the plane of rotation only.

18. In a hydraulic transmission two members rotatable about substantially parallel axes, one of said members having a series of radially disposed cylinder bores, a hollow piston in each bore, a series of crossheads reciprocating longitudinally in said other member, and thrust transmitting means rigidly connected with each crosshead and rockably engaging within one of said pistons.

19. In a hydraulic transmission the combination of a member having a series of cylinder bores radiating from a center, a thrust transmitting piston reciprocating longitudinally in each bore, a reaction member, a crosshead between each piston and said reaction member, and a thrust transmitting element rigidly connected with each crosshead and rockably engaging the cooperating piston.

20. In a hydraulic transmission mechanism the combination of a pintle, a series of piston and cylinder assemblies radially disposed about said pintle, a member having a series of reaction faces, one opposite each piston and cylinder assembly and extending normal to the axis of reciprocation thereof, and a crosshead between each piston and cylinder assembly and adjacent face and rockably associated with said assembly.

21. In a hydraulic transmission the combination of a pintle, a series of piston and cylinder assemblies radially disposed about said pintle, a reaction member, a crosshead between said member and each of said assemblies and extending substantially normal to the longitudinal axis of the associated assembly, and connections between each crosshead and the associated assembly permitting slight rocking action therebetween.

Signed at Buffalo, N. Y., this 2nd day of February, 1918.

WILLIAM E. MAGIE.

Witnesses for William E. Magie:
CHARLES J. SIMEON,
JAMES F. DUFFY.

Signed at South Milwaukee, Wisconsin, the 9th day of March, 1918.

WALTER FERRIS.

Witnesses for Walter Ferris:
E. H. MUELLER,
GEO. H. RONDEAU.